United States Patent [19]

Rogier

[11] Patent Number: 4,540,073
[45] Date of Patent: Sep. 10, 1985

[54] WHEEL HUB WITH REDUCTION GEAR AND MULTIPLE DISC BRAKE

[75] Inventor: Léonce Rogier, Saint-Denis, France

[73] Assignee: SO.M.A. Europe Transmission-Societe Nouvelle Mecanique et Automobile, Saint-Etienne, France

[21] Appl. No.: 443,689

[22] Filed: Nov. 22, 1982

[30] Foreign Application Priority Data

Nov. 23, 1981 [FR] France .................. 81 21885

[51] Int. Cl.³ .............. F16D 65/32; B60K 41/26
[52] U.S. Cl. .................. 192/4 A; 74/411.5; 188/71.5
[58] Field of Search .......... 192/4 A, 4 R, 70.2, 192/85 AA, 107 R, 70.19, 70.28, 70.12, 12 C, 18 A; 188/71.1, 71.5, 366; 74/781 R, 411.5, 391

[56] References Cited

U.S. PATENT DOCUMENTS

| 3,899,050 | 8/1975 | Savary et al. | 192/107 M |
| 3,923,128 | 12/1975 | Lucien et al. | 192/107 M |
| 4,128,145 | 12/1978 | Euler | 188/71.5 |
| 4,142,615 | 3/1979 | Sidles et al. | 192/4 A |
| 4,146,116 | 3/1979 | Cumming | 188/71.5 |
| 4,317,512 | 3/1982 | Sato | 192/18 A |
| 4,391,351 | 7/1983 | Jirousek et al. | 74/781 R |

FOREIGN PATENT DOCUMENTS

| 0697741 | 1/1962 | Canada | 192/85 AA |
| 2392279 | 12/1978 | France . | |
| 0752667 | 7/1956 | United Kingdom | 192/85 AA |
| 1455069 | 11/1976 | United Kingdom . | |
| 2075622 | 11/1981 | United Kingdom . | |
| WO80/02821 | 12/1980 | PCT Int'l Appl. . | |

Primary Examiner—George H. Krizmanich
Attorney, Agent, or Firm—Charles A. Brown; Charles E. Brown

[57] ABSTRACT

A wheel hub suitable for industrial vehicles, having, in a hollow body a reduction gear and a brake being located at the end of the shaft of the reduction gear. The brake has, alternating with interpolated discs rotationally fast on the hollow body, a plurality of brake discs rotationally fast on the shaft of the reduction gear, the interpolated discs being mounted to rotate freely on a single support column which is parallel to the said shaft, is offset in relation to the latter and is fixed to the hollow body.

17 Claims, 9 Drawing Figures

WHEEL HUB WITH REDUCTION GEAR AND MULTIPLE DISC BRAKE

BACKGROUND OF THE INVENTION

The present invention relates, in general terms, to wheel hubs and is aimed, more particularly, at those intended for equipping industrial vehicles or agricultural or public works equipment.

Being more specifically a driving wheel hub, such a wheel hub conventionally takes the form of a hollow body in which a reduction gear is located, to bring the rotational speed to a permissible value, the sun gear shaft of the reduction gear being designed to be rotationally fast with the corresponding wheel shaft, while the planetary gear carrier of the reduction gear is fixed to the hollow body.

A brake must be associated with such a hub, and this brake must be subjected to at least one control, or operating control.

This can be, especially, a disc brake.

In such a case, this brake usually comprises only a single brake disc, and this brake disc is located outside the hollow body of the wheel hub in question, between the latter and the axle at the end of which the wheel hub is mounted.

Being thus open to the surroundings, this brake is subjected to all kinds of material thrown up, to the detriment of its operation and its useful life.

Moreover, it is not readily accessible, and, in practice, to change its brake pads after wear, it is necessary first of all to remove the wheel mounted on the wheel hub in question, and this is relatively difficult when, as in this particular case, a wheel of large diameter is concerned.

However, to avoid these disadvantages, it has already been proposed to locate the brake at the end of the wheel hub with which it is associated, that is to say beyond this wheel hub in relation to the axle at the end of which the latter is itself mounted.

In such a case, the brake can, for example, be mounted in a special compartment which protects it from the surroundings, while making it possible to use, as before, friction linings which work in a dry state.

Alternatively, it can be mouned in a compartment communicating with the hollow body of the wheel hub with which it is associated and can consequently run in the oil present in this hollow body for the purpose of lubricating the corresponding reduction gear.

The advantage which can be achieved, in this case, from such an arrangement is nomally twofold: on the one hand, the oil in question, which is kept in circulation, participates in dissipating the heat energy generated during braking, and, on the other hand, it minimises the wear of the friction linings and, in practice, avoids the need for any maintenance.

However, this being so, since the coefficient of friction is lower, the brake to be used must be a multidisc brake, that is to say a brake comprising a plurality of brake discs alternating with interpolated discs.

The brake discs are rotationally fast on the corresponding shaft, while the interpolated discs are rotationally fast on the hollow body.

Since such discs must also be movable axially to allow axial clamping of the brake discs during braking, a splined assembly is conventionally provided both between the brake discs and the corresponding shaft and between the interpolated discs and the hollow body of the hub.

Although such an assembly of a multidisc brake at the end of a wheel hub may thus be satisfactory, in practice it leads to difficulties.

First of all, although the splined assembly between the brake discs and the corresponding shaft does not of itself present too much difficulty because it acts on a relatively small and inside diameter, the same is not true of the splined assembly between the interpolated discs and the hollow body of the hub.

In fact, such a splined assembly acts on a relatively large and outside diameter.

Now, for the necessary axial mobility it is indispensable that play be provided between the interpolated discs and hollow body in the corresponding splined assembly, and, because this splined assembly acts on a relatively large and outside diameter, this play must itself be necessarily relatively large to allow for the thermal expansion taking place during operation, this then being unfavorable since it leads to a reduction in play, whereas on an inside diameter it leads to an increase in this play and is, on the contrary, favorable.

Because of the reciprocating movement which the interpolated discs undergo during operation, this play is the cause of damage to the splines of this splined assembly, and this can result in their destruction.

Furthermore, since it is possible, in practice, to fill the hollow body of the wheel hub in question only partially with oil, to prevent an excessive loss of power as a result of braking during operation and to prevent the development of a leak to which the oil would inevitably be subject during operation because of its thermal expansion if the initial filling was total, there arises, during operation, an oil ring in the hollow body as a result of centrifuging, the oil abandoning the central part of this hollow body to collect in the peripheral part of the latter, in such a way that the friction linings of the brake discs can then no longer run in the oil and they function in a dry state, to the detriment of their useful life, since these friction linings are not normally intended for such dry operation.

Moreover, although the circulation of oil is sufficient to dissipate the energy during braking below relatively moderate speeds, for example of the order of 40 km/h, it seems, in practice, too limited beyond this, and especially so when the brake is used for slowing down.

Finally, this oil, which is a so-called extreme-pressure oil, the qualities of which have been selected to correspond to those necessary for the reduction gear, is not suitable for the brake: it is desirable, for the reduction gear, that the oil should have a high shearing resistance, whereas it is desirable, for the brake, that it should have, on the contrary, a low shearing resistance.

An object of the present invention is in general terms, to provide arrangements which make it possible to avoid these disadvantages.

SUMMARY OF THE INVENTION

More precisely, the invention concerns a wheel hub, especially for an industrial vehicle, agricultural equipment or public works equipment, of the type comprising, in a hollow body, on the one hand a reduction gear and on the other hand a brake which has at least one brake disc rotationally fast with the shaft of the reduction gear, this wheel hub being characterised, according to a first aspect, in that, with the brake comprising a plurality of brake discs alternating with interpolated discs, the interpolated discs are mounted to rotate freely on a single support column which, parallel to the shaft of the reduction gear, is offset in relation to the latter.

In practice, since each of the interpolated discs is delimited by two circular peripheral edges, one on the inside and the other on the outside, the outer peripheral edge of such an interpolated disc is eccentric in relation to its inner peripheral edge which is coaxial with the shaft of the reduction gear, and, to buttress the interplated discs, the inner surface of the wall of the hollow body which surrounds the brake is itself eccentric in relation to the shaft and is coaxial with the outer peripheral edge of the interpolated discs.

Thus, according to the invention, the conventional splined assembly is replaced by a simple oscillatory mounting on a column, interacting with an offset surface of the hollow body to ensure the necessary buttressing.

This being so, the play to be provided in line with the support column for the desired axial mobility can advantageously be very slight, because, since the diameter of this support column is itself relatively small, the thermal expansion during operation of the interpolated discs adjacent this support column is itself relatively low, and because, since it acts on an outside diameter, generous freedom of expansion can be given by means of a suitable play, to the said interpolated discs.

The risk of damage is thereby diminished, and indeed even eliminated.

This is all the more so because this damage no longer occurs on splines, but on a circular surface, both internally on the support column and externally on the corresponding offset wall of the hollow body.

Moreover, and despite the fact that an oil ring develops, during operation, at least part of the friction linings carried by the brake discs safely dips into this oil permanently because the ring is offset in relation to the friction linings, this offsetting resulting from that of the corresponding wall of the hollow body in relation to the brake discs.

Furthermore, the interpolated discs according to the invention are advantageously economical to produce, both of their peripheral edges being strictly circular, without splines.

The same is true of the thrust disc conventionally used to ensure the axial clamping of the brake discs and the interpolated discs, and according to the invention this thrust disc is, like the latter, mounted to rotate freely on the support column.

In particular, this thrust disc can advantageously be rough-cut, as can the interpolated discs.

Moreover, if desired, according to a second aspect, the wheel hub according to the invention is also characterised in that the compartment of the hollow body in which the brake is located is sealed off from the rest of the hollow body, and ducts extend in the wall of the hollow body for the circulation of a specific cooling fluid in the compartment, the ducts opening, on the one hand, into the compartment and, on the other hand, into adjacent annular spaces which, being delimited axially by rotary gaskets, extend radially between the hollow body and a fixed piece which is itself perforated with passages designed to connect the annular spaces to service pipes.

It is thus advantageously possible to use for the brake an oil which is much more suitable for the specific operating conditions of such a brake than the oil which is still used for the reduction gear.

This can be, for example, the low-pressure oil usually present in the vehicles or equipment concerned for serving various hydraulic circuits.

Such an oil, which is highly fluid, is free of any extreme-pressure additive detrimental to the coefficient of friction and to stable functioning and is expecially suitable for such a brake.

Moreover, the cooling conditions of this brake are improved thereby, because, on the one hand, the volume of oil in question is greater and, on the other hand, the corresponding heat-exchange surface, linked to the capacity of the relevant oil tank of the vehicle or equipment concerned, is itself greater.

Finally, there is no fear of any risk of error as regards the oil to be used for the brake, since it is sufficient to connect the latter to the oil circuit already present in the vehicle or equipment in question, profiting, in addition, from the filter system conventionally provided on the latter.

In all cases, the wheel hub according to the invention can be equipped without difficulty, for this brake, with a second control, or emergency of parking control, utilising, for the installation of the second control, the annular volume left free in its hollow body beyond the ring-holder of its reduction gear in relation to the brake.

According to the invention, since the brake is subjected to a control piston which, itself subjected to an operating control, is located on a first side of the hub of the reduction gear, the emergency or parking control is located on the opposite side of the hub, and push rods extend axially from the emergency or parking control to the control piston via the hub.

It is thus easily possible to use, for the wheel hub, two separate controls for the brake which the latter possesses.

Apart from the fact that a single brake is thus used advantageously and economically, this brake acts advantageously as near as possible to the wheel, whether during operation or during an emergency or parking, and it consequently has high efficiency and great reliability.

DESCRIPTION OF THE PREFERRED EMBODIMENTS

Figure 1:
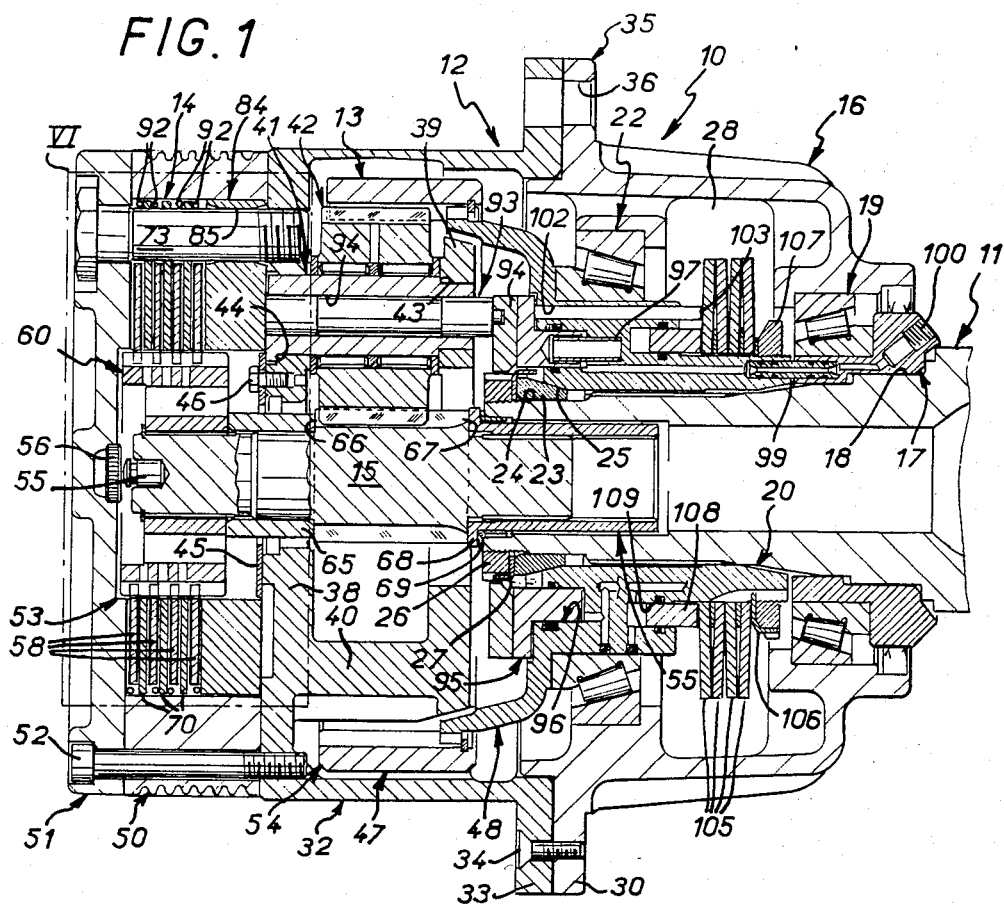
FIG. 1 is a view in axial section of a wheel hub according to the invention.

As illustrated by these Figures, the wheel hub 10 according to the invention, which is intended to be installed on the axle 11 of the wheel, comprises, in general terms, a hollow body 12 and in the latter is both a reduction gear 13 and a brake 14, said brake being located at the end of the sun gear shaft 15, of the wheel reduction gear 13.

In practice, in the embodiment illustrated, the hollow body 12 is formed in several parts placed successively axially end to end one after another.

There is, first of all, a hub member 16 round the end of the axle 11.

A first bearing 19 is provided between the hub member 16 and a gasket-holder supply casing 17 engaged on a journal 18 of the axle 11.

A second bearing 22 is provided, spaced from the first bearing 19, in parallel between the hub member 16 and a distribution sleeve 20 engaged on the axle 11 by means of a spline assembly.

A locking cone 23, engaged on a cylindrical bearing surface 24 of the axle 11 and interacting with a conical bearing surface 25 of the distribution sleeve 20, ensures that the unit as a whole is held in place under the stress of a nut 26 engaged by screwing on the end, threaded for this purpose, of the axle 11, interacting with a lock washer 27.

On the inside, between the bearings 19 and 22, the hub member 16 forms a chamber 28 around the distribution sleeve 20.

On the outside, the hub member 16 has a collar 30 which projects radially.

The hollow body 12 also carries a planetary gear carrier 32.

On the outside, the planetary gear carrier 32 has a readially projecting collar 33 by means of which it is secured face to face with the collar 30 of the hub member 16, by screws 34.

The collars 30, 33, joined together in this way, jointly form the fastening flange 35 for the wheel in question, this fastening flange having in circumferentially spaced relation, for this purpose, bores 36 adapted to receive the bolts conventionally used for fastening the rim of such a wheel.

At its axial end opposite its collar 33, the planetary gear carrier 32 forms transversely an annular wall 38, and on the inside it has a second annular wall 39 connected by axial ribs 40 to the preceding wall.

Between these annular walls 38, 39, there extend circumferentially spaced pins 41 on which satellite pinions 42 are mounted rotatably.

Each of these pins 41 bears by means of a shoulder 43 on the inner annular wall 39 and by means of a shoulder 44 on the front annular wall 38, an annular plate 45, attached by screws 46 to the latter, ensuring that they are all maintained axially in place in relation to the said annular walls 38, 39.

On the inside, the satellite pinions 42 engage with the sun gear shaft 15, and on the outside they engage with a fixed ring gear 47 which, being located annularly beyond the inner annular wall 39 and ribs 40 connecting the latter to the front annular wall 38, is carried by a ring gear holder 48.

In the embodiments of the invention which are illustrated, the distribution sleeve 20 forms the hub of the ring gear holder 48.

The hollow body 12 of the wheel hub according to the invention also carries an annular spacer 50 and, to close the body 12 transversely, a cover 51, the unit as a whole being attached axially by screws 52 to the front annular wall 38 of the planetary gear carrier 32.

Together with the cover 51 and the front annular wall 38 of the planetary gear carrier 32, the annular spacer 50 defines a compartment 53 in which the brake 14 is located.

The sun gear shaft 15 of the reduction gear 13 moreover extends axially on either side of the compartment 54 formed by the planetary gear carrier 32 for receiving this reduction gear 13: on the same side as the hub member 16, it engages by means of a splined assembly with a coupling sleeve 55 which extends on the inside of the axle 11 and which is intended itself to engage by means of a similar splined assembly with a wheel shaft (not shown), and on the opposite side to the hub member 16 it extends into the compartment 53 in which the brake 14 is located.

At its free end, it carries axially a stud 55 for axial abutment against an insert 56 attached for this purpose in the central zone of the cover 51.

These arrangements are well known per se, and since they are not part of the present invention they will not be described in any more detail here.

Likewise in a manner known per se, the brake 14 comprises at least one brake disc 58 mounted on the sun gear shaft 15 of the reduction gear 13 to be rotationally fast with said shaft.

In practice, in the embodiments of the invention which are illustrated, the brake 14 is a multi-disc brake.

It therefore comprises a plurality of brake discs 58 alternating with interpolated discs 70 which are rotationally fast with the hollow body 12.

Figure 6:
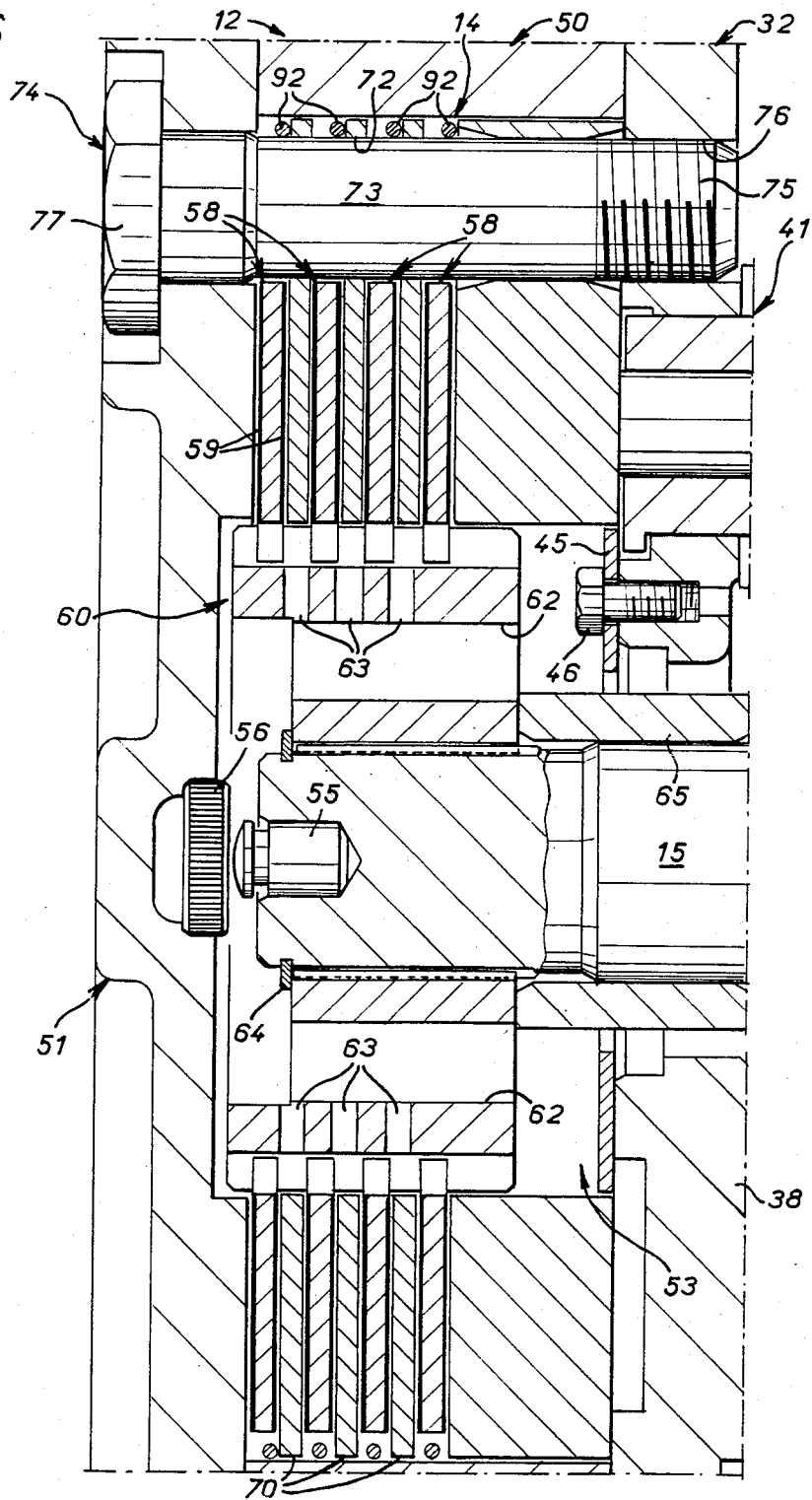
FIG. 6 repeats, on a larger scale, part of FIG. 1 which is marked by an inset VI.

The brake discs 58, of which there are four in the embodiments of the invention which are illustrated, each consist, for example, of an annular metal plate, each face of which is covered with a friction lining 59, FIG. 6.

They are each defined by two circular peripheral edges, one on the outside and the other on the inside.

In a manner known per se, these circular peripheral edges are coaxial.

The outer circular peripheral edge of each brake disc 58 is smooth, while the inner peripheral edge is toothed to engage with a pinion 60 which, by means of a splined assembly, is made rotationally fast with the sun gear shaft 15 of the reduction gear 13.

In the embodiment illustrated in FIGS. 1 to 6, this pinion 60 has axial passages 62 and radial passages 63 for the circulation of oil in the compartment 53.

At all times, by means of a split ring 64 attached to the sun gear shaft 15, the shaft 15 is maintained axially supported against a ring 65 which, surrounding the sun gear shaft 15 at the point where the latter passes through the front annular wall 38 of the planetary gear carrier 32. The sun gear shaft 15 bears axially against the shoulder 66 which is adjacent, at their corresponding end, the splines or sun gear portion by means of which the sun gear shaft 15 engages with the satellite pinions 42 while, at the other end of the splines, or sun gear the coupling sleeve 55 is also maintained axially in place. The coupling sleeve 55 has for this purpose a radial collar 68 inserted axially between the shoulder 67 at the other end of the splines or sun gear, on the one hand, and, with the insertion of a bearing 69, the end portion of the axle 11, on the other hand.

While being rotationally secure with the pinion 60, the brake discs 58 are movable axially along the latter.

According to the invention, the interpolated discs 70, of which there are three in the embodiments of the invention which are illustrated, are each mounted to pivot freely by means of a bore 72, on a single support column 73 which is parallel to the sun gear shaft 15 of the reduction gear 13 and is offset in relation to the shaft 15.

In the embodiments of the invention which are illustrated, this support column 73 is formed by the smooth shank of a screw 74, the threaded end 75 of which is engaged by screwing in a tapped bore 76 in the front annular wall 38 of the planetary gear carrier 32 and the head 77 of which bears on the cover 51.

In practice, the interpolated discs 70 are engaged only with very slight play on their support column 73.

It is therefore by means of this support column 73 that, while being movable axially along the support column, they are made rotationally secure with the hollow body 12.

Figure 7:
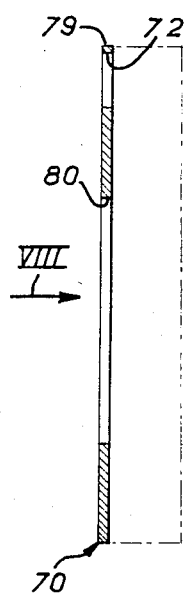
FIG. 7 is a view in axial section of one of the interpolated discs per se used in the wheel hub according to the invention.
Figure 8:
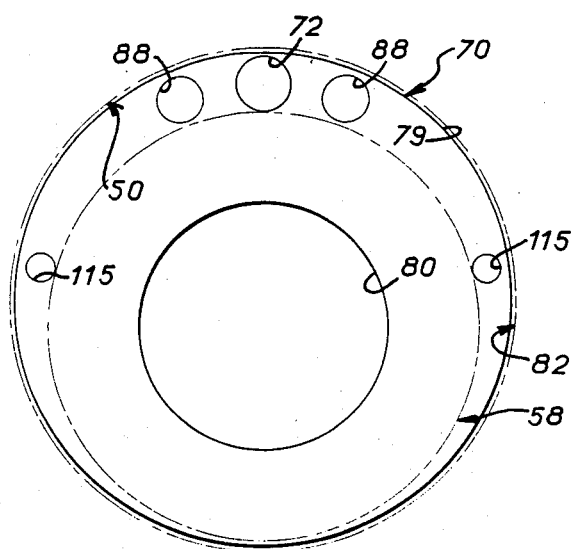
FIG. 8 is an elevation view of the interpolated disc taken along the arrow VIII in FIG. 7.

The interpolated discs 70, which are all identical to one another, can each consist, for example, of a metal plate, FIGS. 7 and 8.

In the embodiments of the invention which are illustrated, they are each delimited by two circular peripheral edges 79,80, one on the outside and the other on the inside.

Both of these are, in practice, smooth edges.

According to the invention, the outer edge 79 is eccentric relative to the inner edge 80 which, on the other hand, is coaxial with the sun gear shaft 15 of the reduction gear 13, like the brake discs 58.

In conjunction with this, to buttress the interpolated discs 70, the inner surface 82 of the wall of the hollow body 12 which surrounds the brake 14, and in embodiments of the invention which are illustrated this is therefore the inner surface of the annular spacer 50, is eccentric relative to the sun gear shaft 15 of the reduction gear 13, being coaxial with the outer peripheral edge 79 of the interpolated discs 70.

So that the originality of this arrangement is more evident, the outer contour of the brake discs 58 and the inner wall 82 of the annular spacer 50 have been indicated diagrammatically by broken lines in FIG. 8.

In practice, and in a manner known per se, the brake 14 also includes a thrust disc 84 which is rotationally secure with the hollow body 12 and which is adapted to ensure axial clamping of the brake discs 58 and the interpolated discs 70.

According to the invention, and like the interpolated discs 70, the thrust disc 84 is mounted, by means of an axial passage 85, so as to pivot freely on the support column 73 and, has two circular peripheral edges, one on the outside and the other on the inside, its outer peripheral edge being eccentric relative to its inner peripheral edge, while the latter is coaxial with the sun gear shaft 15 of the wheel reducer 13.

In practice, in the embodiments of the invention which are illustrated, the passage 85 in the thrust disc 84 widens at each of its axial ends.

At all events, this thrust disc 84 can advantageously be rough-cut, according to the invention, and no toothing need be provided on either of its peripheral edges which, on the contrary, are both smooth.

The same is true of the interpolated discs 70.

In the compartment 53, the thrust disc 84 is permanently subjected to elastic restoring means which, bearing on the cover 51, stress it in the direction of the front annular wall 38 of the planetary gear carrier 32 for the purpose of unclamping the brake discs 58.

Figure 2:
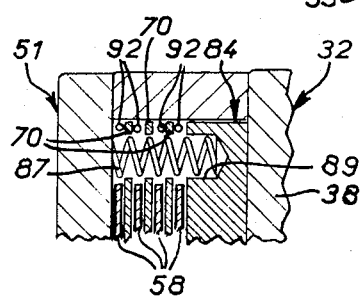
FIGS. 2 to 5 are other partial views of the wheel hub in axial section, along various different axial planes.
Figure 3:
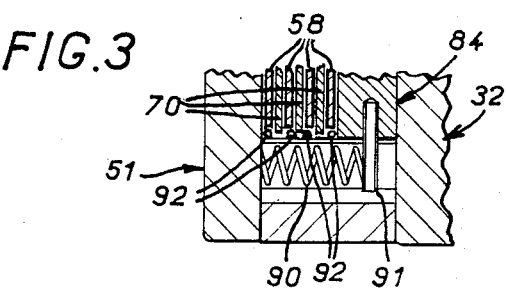

In the embodiments of the invention which are illustrated, these restoring means comprise, on the offset side of the interpolated discs 70 and of the thrust disc 84, springs 87, of which there are two in practice and which, after passing through the said interpolated discs 70 by means of passages 88 made for this purpose in the latter, bear on the bottom of blind bores 89 provided in the thrust disc 84, FIG. 2. The restoring means further comprise, on the opposite side to the interpolated discs 70 and the thrust disc 84, springs 90, of which there are also two in practice and which, extending axially beyond the interpolated discs 70, bear on pins 91 which project radially from the periphery of the thrust disc 84, FIG. 3.

In conjunction with this, the interpolated discs 70 alternate on their periphery with corrugated rings 92 designed to stress them axially away from one another.

For axially clamping the brake discs 58 and the interpolated discs 70, the thrust disc 84 is subjected on its face opposite the springs 87, 90 to push rods 93 which pass axially through the reduction gear 13, these push rods 93 each being individually mounted to slide in an inner bore 94 in the pins 41 of the satellite pinions 42.

At their end opposite the thrust disc 84, these push rods 93 are connected to one another, in the compartment 54, by means of a common annular plate 94.

This plate 94 is itself subjected to an annular piston 95 mounted so as to be axially movable in a cylinder 96 formed in the distribution sleeve 20, while being rotationally secured on the distribution sleeve 20 by means of axial pins 97.

By means of passages made for this purpose in the distribution sleeve 20, in a finger 99 connecting the latter in a leak-proof manner to supply casing 17, and in this supply casing 17, the cylinder 96 is connected to a nozzle 100 of the supply casing 17, which is itself capable of being connected to any service pipe (not shown) designed for supplying it.

In a similar way, the cylinder 96 is capable of being connected to a bleed screw.

Thus, by means of the push rods 93, the plate 94 and the control piston 95, the brake 14 is subjected to a first control, or operating control.

According to the invention, it is also subjected to a second control, or emergency or parking control.

For this purpose, since the control piston 95 is located on a first side of the hub which the distribution sleeve 20 forms for the ring-holder 48, the emergency or parking control is on the opposite side to the hub, in the chamber 28 formed by the hub member 16, and via the said hub, by means of passages 102 provided axially in the latter, push rods 103 extend from this emergency or parking control to the control piston 95.

In the embodiment illustrated, the emergency or parking control comprises a stack of elastic washers of the cup-spring type 105 which, bearing by means of a lock nut 106 on a nut 107 engaged by screwing on the distribution sleeve 20 on the side of the latter opposite the ring-holder 48, bear on the push rods 103.

Figure 5:
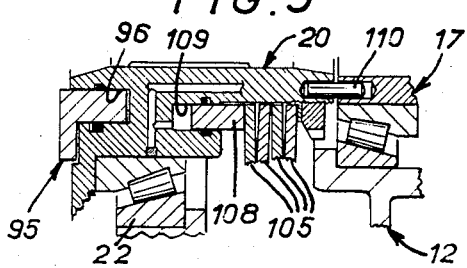

During normal operation, elastic washers 105 are buttressed and maintained compressed by an annular piston 108 mounted so as to be axially movable in a cylinder 109 provided in the distribution sleeve 20, the cylinder 109, like the cylinder 96, being capable of being connected to a service pipe designed for supplying it and to a bleed screw via passages provided in the distribution sleeve 20, in the fingers connecting the latter to the supply casing 17 and in this supply casing 17, FIGS. 1 and 5.

In the embodiments of the invention which are illustrated, moreover, pins 110 are provided axially, from place to place, between the distribution sleeve 20 and the supply casing 17 for the purpose of rotationally securing the latter on the distribution sleeve 20 which is itself rotationally fast with the axle 11.

Figure 4:
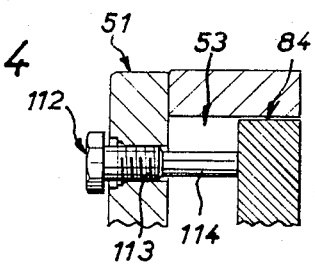

Furthermore, in the embodiments illustrated in the Figures, there are, for manual unlocking of the brake 14, screws 112 which, engaged by screwing in threaded bores 113 into the cover 51, FIG. 4, have within the compartment 53 prolongations 114 by means of which they are designed to act on the thrust disc 84, after passing through passages 115 provided in the interpolated discs 70, FIG. 8.

During operation, the cylinder 109 is normally under pressure, and the annular piston 108 then occupies an extended position in which it maintains the cup springs 105 compressed.

With the springs 87, 90 together keeping the thrust disc 84 in the retracted position, the brake 14 is normally released.

If, on the other hand, fluid under pressure is delivered to the cylinder 96, the annular piston 95 causes, by means of the plate 94 and the push rods 93, the thrust disc 84 to pass into the advanced position in which it ensures axial clamping of the brake discs 58 and the interpolated discs 70.

The sun gear shaft 15, on which the brake discs 58 are rotationally secured, is then braked, and the same is true of the hollow body 12 to which the planetary gear carrier 32 belongs, and consequently the same is true of the hub 10 as a whole.

When the pressure in the cylinder 96 is relaxed, the springs 87, 90 bring the thrust disc 84 back into the retracted position, and the brake discs 58 are then released again.

During braking for parking, or in the event of a breakdown, the pressure in the cylinder 109 is relaxed.

The cup springs 105 then cause, by means of the push rods 103, the annular piston 95 and the push rods 93, the axial clamping, via the thrust disc 84, of the brake discs 58 and, as before, the sun gear shaft 15 and consequently, via this, the hub 10 as a whole is then braked.

For manual release of the brake 14, it is subsequently sufficient to act on the screws 112 as a result.

In the embodiment illustrated in FIGS. 1 to 8, the compartment 53 of the hollow body 12, in which the brake 14 is located, communicates with the rest of this hollow body 12 and especially with the compartment 54 of the latter, in which the reduction gear 13 is located, via the annular space existing between the ring 65, which surrounds the sun gear shaft 15 of the reduction gear 13, and the corresponding axial orifice in the front annular wall 38 of the planetary gear carrier 32.

Consequently, the brake 14 dips into the same oil as that in which the reduction gear 13 dips.

Figure 9:
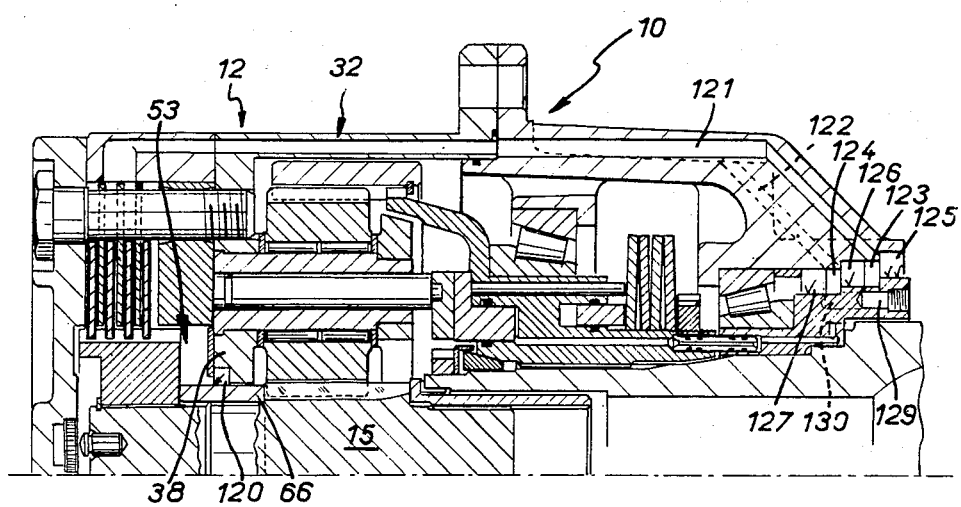
FIG. 9 is a half-view in axial section similar to that of FIG. 1 of an alternative embodiment of the wheel hub according to the invention.

As an alternative, FIG. 9, the compartment 53 of the hollow body 12, in which the brake 14 is located, is made leak-proof in relation to the rest of the said hollow body 12, a gasket 120 being used especially for this purpose between the ring 66 and the front annular wall 38 of the planetary gear carrier 32.

In conjunction with this, ducts 121, 122 extend in the wall of the hollow body 12 for the circulation of a specific cooling fluid in the compartment 53, the ducts opening, on the one hand, at one of their ends into the compartment 53 and, on the other hand, at their other end, open into annular spaces 123, 124 which, being defined axially by rotary gaskets 125, 126 and 127, extend radially between the hollow body 12 and the fixed element constituting the supply casing 17, this fixed element itself being perforated with passages 129, 130 designed for connecting the annular spaces 123, 124 to service pipes (not shown).

Thus, the brake 14 can advantageously dip into a specific oil which is better suited to its actual operating conditions.

Of course, the present invention is not limited to the embodiments described and illustrated, but embraces any modifications within the scope of the appended claims.

In particular, although, in the foregoing, the interpolated discs of the brake used and their support column are rotationally secure on the hollow body because the said brake is located at the end of the said hollow body, it is not necessarily always so; for example, if the brake is installed in the inner volume of the ring gear of the associated reduction gear, its interpolated discs and their support column are rotationally fast with the ring gear, the inner wall of the said ring buttressing the interpolated discs.

GENERAL OPERATION

A wheel hub according to the invention includes a hollow stub axle 11 which is fixed and which receives a driving shaft (not shown). The distribution sleeve 20, the ring holder 48 and fixed ring 47, and the casing 17 are all fixed relative to the stub axle. The non-illustrated driving shaft drives the planetary shaft 15 through couple sleeve 55 which, in turn, drives the planetary gear set. The hollow body 12 is connected to the planetary gear carrier 32 and rotates the hub member 16. Bearings 19 and 22 permit the hub member 16 to rotate with respect to this stub axle 11 and the casing 17.

In normal braking operations, the supply of hydraulic fluid urges piston 95 to the left in FIG. 1 which, in turn, urges the rods 93 against the thrust disc 84 so as to clamp discs 58 and 70 and prevent further rotation of the hub body 12. Emergency braking is provided by cup springs 105 acting through rod 103 for applying axial force against the piston 95.

I claim:

1. A wheel hub comprising a hollow body, said hollow body housing a reduction gear and a brake, said reduction gear having a shaft, said brake including a plurality of brake discs, at least one of said brake discs being rotationally fast with said shaft of said reduction gear, said brake further including a plurality of interpolated discs alternating with said brake discs, a single support column mounting with play each of said interpolated disc for axially movement thereon, said support column being disposed parallel to and spaced from said reduction gear shaft.

2. A wheel hub according to claim 1, wherein each of said interpolated discs has an inner and an outer circular peripheral edge, said outer peripheral edge of each of said interpolated discs being eccentric relative to said inner peripheral edge.

3. A wheel hub according to claim 2, wherein said hollow body has a wall surrounding said brake, said wall having an inner surface disposed eccentric with respect to the axis of said reduction gear shaft and coaxial with respect to said outer peripheral edges of said interpolated discs, said wall inner surface being closely spaced around said outer peripheral edges of said interpolated discs.

4. A wheel hub according to claim 1, wherein said brake comprises a thrust disc for axially clamping said brake discs and said interpolated discs, said thrust disc also being freely mounted on said single support column.

5. A wheel hub according to claim 2, wherein said thrust disc has circular inner and outer peripheral edges, said outer peripheral edge being eccentric with respect to said inner peripheral edge.

6. A wheel hub according to claim 4, wherein said support column extends through a passage in said thrust disc, said passage flaring at each end.

7. A wheel hub according to claim 4, wherein said thrust disc has a rough cut manufactured condition.

8. A wheel hub according to claim 1, further comprising means for controlling said brake comprising push rods which pass through said reduction gear and are connected to a control piston, said control piston being selectively actuated by service brake actuating means and emergency or parking brake actuating means.

9. A wheel hub according to claim 8, wherein said reduction gear comprises a ring gear carrier having a hub, said control piston being on one side of said ring gear carrier hub, said emergency or parking actuating means being on the opposite side of said hub, and said push rods extending axially from said emergency or parking actuating means to said control piston through said hub.

10. A wheel hub according to claim 1, wherein said hollow body includes a compartment defining a fluid tight housing for said brake relative to the rest of said hollow body, ducts extending through a wall of said hollow body for circulating a cooling fluid in said compartment, said ducts opening at one of their ends into said compartment and their other ends into adjacent annular spaces, said annular spaces being axially limited by rotary gaskets extending annularly between said hollow body and a fixed element, said fixed element having passages for connecting said annular spaces to service pipes.

11. A hub wheel according to claim 5, wherein said thrust disc has a rough as manufactured condition.

12. A hub wheel according to claim 6, wherein said thrust disc has a rough as manufactured condition.

13. A hub wheel according to claim 3, wherein said single support column in combination with the complementary eccentric inner surface of the wall of said housing and the peripheral edges of said interpolated discs cooperates to limit movement of the interpolated discs generally in their planes.

14. A hub wheel according to claim 3, wherein said single support column in combination with the complementary eccentric inner surface of the wall of said housing and the peripheral edges of said interpolated discs cooperates to guide said interpolated discs axially.

15. A hub wheel according to claim 12, wherein said single support column in combination with said complementary eccentric inner surface of the wall of said housing and the peripheral edges of said interpolated discs cooperates to guide said interpolated discs axially.

16. A hub wheel according to claim 1, wherein said housing includes means for limiting movement of said interpolated discs generally in their planes in cooperation with said single support column.

17. A hub wheel according to claim 16, wherein said means for limiting movement of said interpolated discs is an inner sidewall surface of said housing.

* * * * *